(12) United States Patent
Wang et al.

(10) Patent No.: US 11,731,110 B2
(45) Date of Patent: Aug. 22, 2023

(54) PROTONATED DIMERIC IONIC LIQUID TO ENHANCE PERFORMANCE OF MEMBRANE ASSEMBLY ELECTRODE (MEA)

(71) Applicant: Toyota Motor Engineering & Manufacturing North America, Inc., Plano, TX (US)

(72) Inventors: Liang Wang, Saline, MI (US); Hongfei Jia, Ann Arbor, MI (US); Joan F. Brennecke, West Lake Hills, TX (US); Oscar Morales Collazo, Austin, TX (US); Hisao Kato, Nagoya (JP)

(73) Assignees: TOYOTA MOTOR ENGINEERING & MANUFACTURING NORTH AMERICA, INC., Plano, TX (US); BOARD OF REGENTS, THE UNIVERSITY OF TEXAS SYSTEM, Austin, TX (US); TOYOTA JIDOSHA KABUSHIKI KAISHA, Aichi Prefecture (JP)

(*) Notice: Subject to any disclaimer, the term of this patent is extended or adjusted under 35 U.S.C. 154(b) by 56 days.

(21) Appl. No.: 17/466,546

(22) Filed: Sep. 3, 2021

(65) Prior Publication Data

US 2023/0096034 A1    Mar. 30, 2023

(51) Int. Cl.
| | | |
|---|---|---|
| *B01J 23/42* | (2006.01) | |
| *H01M 8/1004* | (2016.01) | |
| *H01M 4/86* | (2006.01) | |
| *H01M 4/92* | (2006.01) | |
| *H01M 8/1009* | (2016.01) | |
| *H01M 8/1067* | (2016.01) | |
| *H01M 8/1053* | (2016.01) | |
| *H01M 8/1032* | (2016.01) | |

(52) U.S. Cl.
CPC .......... *B01J 23/42* (2013.01); *H01M 4/8657* (2013.01); *H01M 4/92* (2013.01); *H01M 8/1004* (2013.01); *H01M 8/1009* (2013.01); *H01M 8/1032* (2013.01); *H01M 8/1053* (2013.01); *H01M 8/1067* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,777,823 | B2 * | 9/2020 | Huang | .............. H01M 4/86 |
| 2020/0014034 | A1 * | 1/2020 | Huang | ............ H01M 4/8668 |
| 2020/0220190 | A1 * | 7/2020 | Huang | ............ H01M 8/1004 |

FOREIGN PATENT DOCUMENTS

CN         104774154 A   *   7/2015

OTHER PUBLICATIONS

Guo et al., "Protic Ionic Liquid-Grafted Polybenzimidazole as Proton Conducting Catalyst Binder for High-Temperature Proton Exchange Membrane Fuel Cells", Polymer Testing 96, Jan. 12, 2021, 6 pages, Elsevier Ltd.

* cited by examiner

*Primary Examiner* — Daniel S Gatewood
(74) *Attorney, Agent, or Firm* — Jordan IP Law, LLC

(57) ABSTRACT

A protonated dimeric ionic liquid that enhances and improves the performance of a fuel cell catalyst. The protonated dimeric ionic liquid comprises 9'9'-(butane-1,4-diyl) bis(3,4,6,7,8,9-hexahydro-2H-pyrimido[1,2-a]pyrimidin-1-ium) 1,1,2,2,3,3,4,4,4-nonafluorobutane-1-sulfonate. Membrane electrode assemblies (MEAs) and polymer electrolyte membrane fuel cells (PEMFCs) employing the protonated dimeric ionic liquid are also disclosed.

20 Claims, 6 Drawing Sheets

PROTONATED DIMERIC IONIC LIQUID TO ENHANCE PERFORMANCE OF MEMBRANE ASSEMBLY ELECTRODE (MEA)

FIELD

The present disclosure generally relates to fuel cells and, more particularly, to secondary ionomers for polymer electrolyte membrane fuel cells.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly not implicitly admitted as prior art against the present technology.

Fuel cell vehicles (FCVs) are considered to be more efficient than conventional internal combustion engine vehicles and they have a zero emission powertrain platform. All current commercially available fuel cell vehicles use polymer electrolyte membrane fuel cells (PEMFCs), which include stacks of membrane electrode assemblies (MEAs). While PEMFC technology has been commercialized for decades, it still faces major challenges of high material costs and substantial performance gaps.

PEMFCs typically require efficient proton transport in their electrocatalyst layers in order to carry out the oxygen reduction reaction, and often underperform in very dry conditions due to poor proton transport in the absence of sufficient water. At the same time, excessive water can also impair performance. Moreover, the oxygen reduction reaction (ORR) that occurs at the cathode of PEMFCs has relatively slow chemical kinetics, thus posing an obstacle to cell performance. Even with a platinum catalyst, such cells typically suffer from significant overpotential loss and poor durability. Large amounts of catalyst are often used in order to overcome performance issues; however, this substantially increases cost. Efforts to decrease mass loading in PEMFC MEAs to lower costs have resulted in a decrease in high current density (HCD) performance. The presence of a polymer ionomer in PEMFC MEAs also adversely affects the performance of catalyst due to physical barriers to reactant gas transport and loss of active sites through specific adsorption of polymer-bound sulfonate groups on the catalyst surface.

It would be desirable to develop improved PEMFC catalyst layers having superior proton transport capability under varying humidity conditions, availability of active catalyst, improved function and/or durability with lower cost.

SUMMARY

This section provides a general summary of the disclosure and is not a comprehensive disclosure of its full scope or all of its features.

In various aspects, the present teachings provide an oxygen reduction reaction (ORR) catalyst comprising: a metal catalyst; and a protonated dimeric ionic liquid contacting the metal catalyst. The protonated dimeric ionic liquid comprises 9'9'-(butane-1,4-diyl)bis(3,4,6,7,8,9-hexahydro-2H-pyrimido[1,2-a]pyrimidin-1-ium) 1,1,2,2,3,3,4,4,4-nonafluorobutane-1-sulfonate.

In another aspect, the present disclosure relates to a membrane electrode assembly (MEA) for a polymer electrolyte membrane fuel cell. The MEA comprises a at least one catalyst layer which comprises a metal catalyst; and a protonated dimeric ionic liquid comprising 9'9'-(butane-1,4-diyl)bis(3,4,6,7,8,9-hexahydro-2H-pyrimido[1,2-a]pyrimidin-1-ium) 1,1,2,2,3,3,4,4,4-nonafluorobutane-1-sulfonate.

In another aspect, the present disclosure relates to a membrane electrode assembly (MEA) for a polymer electrolyte membrane fuel cell, wherein the MEA comprises an anodic catalyst layer; a cathodic catalyst layer comprising carbon supported cathodic catalyst particles selected from platinum and a platinum alloy, and a protonated dimeric ionic liquid comprising 9'9'-(butane-1,4-diyl)bis(3,4,6,7,8,9-hexahydro-2H-pyrimido[1,2-a]pyrimidin-1-ium) 1,1,2,2,3,3,4,4,4-nonafluorobutane-1-sulfonate; and a polymer electrolyte membrane mediating protic communication between the anodic catalyst layer and the cathodic catalyst layer.

In yet another aspect, the present disclosure provides a polymer electrolyte membrane fuel cell (PEMFC) comprising a plurality of stacked membrane electrode assemblies (MEAs). Each MEA of the plurality comprises: an anodic catalyst layer; a cathodic catalyst layer comprising carbon supported cathodic catalyst particles selected from platinum and a platinum alloy; and a protonated dimeric ionic liquid comprising 9'9'-(butane-1,4-diyl)bis(3,4,6,7,8,9-hexahydro-2H-pyrimido[1,2-a]pyrimidin-1-ium) 1,1,2,2,3,3,4,4,4-nonafluorobutane-1-sulfonate; and a polymer electrolyte membrane mediating protic communication between the anodic catalyst layer and the cathodic catalyst layer.

In these different aspects, the metal catalyst is a solid metal catalyst. The metal catalyst can comprise nanoparticles of platinum or a platinum alloy such as a platinum-cobalt alloy. The catalyst can also include polymeric ionomer in physical contact with the metal catalyst. The polymeric ionomer may be a perfluorosulfonic acid polymer.

Further areas of applicability and various methods of enhancing the above technology will become apparent from the description provided herein. The description and specific examples in this summary are intended for purposes of illustration only and are not intended to limit the scope of the present disclosure.

DRAWINGS

The present teachings will become more fully understood from the detailed description and the accompanying drawings wherein.

Figure 1:
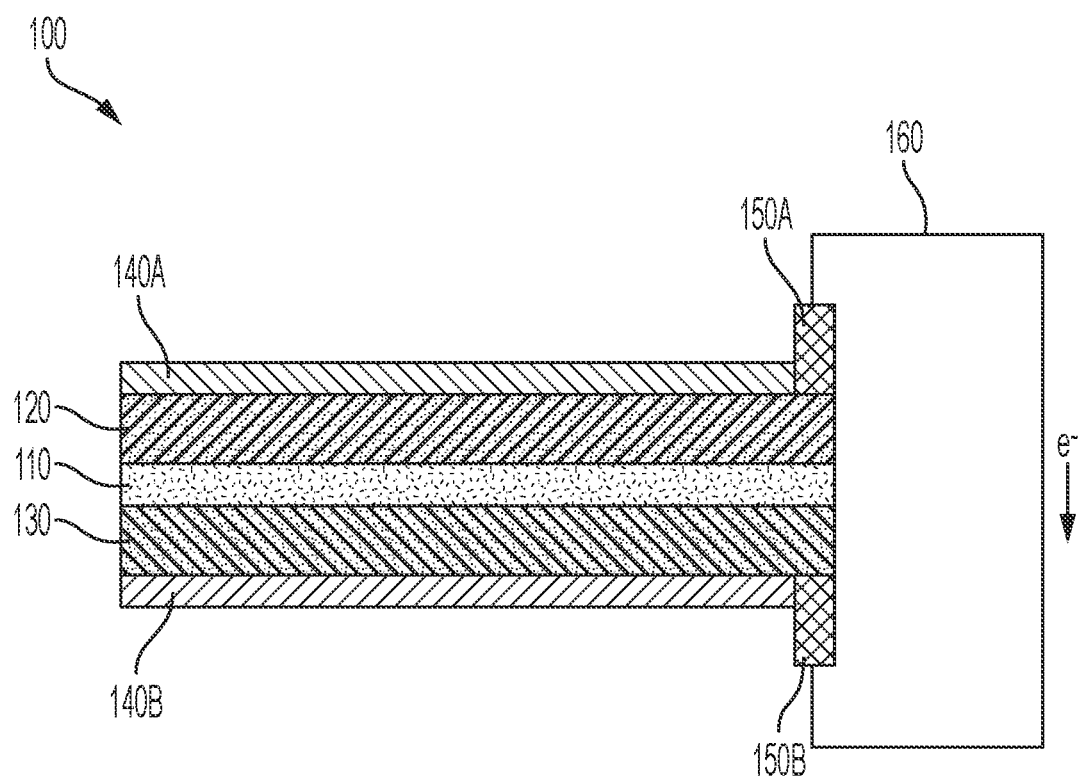
FIG. 1 is a schematic cross sectional view of an example of a membrane electrode assembly of the present disclosure.

It should be noted that the figures set forth herein are intended to exemplify the general characteristics of the methods, algorithms, and devices among those of the present technology, for the purpose of the description of certain aspects. These figures may not precisely reflect the characteristics of any given aspect and are not necessarily intended to define or limit specific examples within the scope of this technology. Further, certain aspects may incorporate features from a combination of figures.

Description

The present teachings describe a protonated dimeric ionic liquid useful as a secondary ionomer in a polymer electrolyte membrane fuel cell (PEMFC). An oxygen reduction reaction (ORR) catalyst contacted by the protonated dimeric ionic liquid and incorporated at the cathode of a PEMFC has superior activity and stability compared to a catalyst having no secondary ionomer or an alternative secondary ionomer.

ORR catalysts of the present teachings include a metal catalyst; and a protonated dimeric ionic liquid contacting the metal catalyst. ORR catalysts can include particles having a catalytic metal, such as platinum. The particles are contacted by the aforementioned secondary ionomer including a protonated dimeric ionic liquid, resulting in superior activity and stability.

Thus, a catalyst composition for catalyzing ORR (referred to alternatively as an ORR catalyst) in a PEMFC is disclosed. The catalyst composition includes a solid catalyst that will typically include particles or another high-surface-area form of a catalytic metal. In some examples, the catalytic metal will be particles of platinum, or a platinum-containing alloy. The catalytic metal particles can be nanoparticles, such as nanoparticles of platinum or a platinum-containing alloy.

In some examples, the solid catalyst will include particles of a catalytic metal in admixture with particles of another material, such as carbon, which can be selected from carbon black, graphite, activated carbon and carbon nanotubes.

The size and shape of the catalytic metal particles can be optimized to maximize total surface area of the catalyst and reaction sites available to participate in the reactions per volume of catalyst used. In some examples, the particles of a catalytic metal will have a specific surface area of at least 10 m$^2$/g, or 20 m$^2$/g, or 30 m$^2$/g, or 40 m$^2$/g, or 50 m$^2$/g, or 60 m$^2$/g, or 70 m$^2$/g, or 80 m$^2$/g, or 90 m$^2$/g, or 100 m$^2$/g.

In some examples, the particles of a catalytic metal will be nanoparticles having an average maximum dimension of less than 100 nm, or less than 90 nm, or less than 80 nm, or less than 70 nm, or less than 60 nm, or less than 50 nm, or less than 40 nm, or less than 30 nm, or less than 20 nm, or less than 10 nm. In some specific examples, the catalyst composition will include platinum nanoparticles having an average maximum dimension of 2-5 nm in diameter. In some examples, the particles of a catalytic metal will include porous particles.

Catalyst compositions of the present disclosure include a secondary ionomer contacting the particles of a catalytic metal. The secondary ionomer includes a protonated dimeric ionic liquid where two anions are coupled to a protonated dimeric cation. In some examples, the protonated dimeric ionic liquid is 9'9'-(butane-1,4-diyl)bis(3,4,6,7,8,9-hexahydro-2H-pyrimido[1,2-a]pyrimidin-1-ium) 1,1,2,2,3,3,4,4,4-nonafluorobutane-1-sulfonate. 9'9'-(butane-1,4-diyl)bis(3,4,6,7,8,9-hexahydro-2H-pyrimido[1,2-a]pyrimidin-1-ium) 1,1,2,2,3,3,4,4,4-nonafluorobutane-1-sulfonate has the following chemical structure:

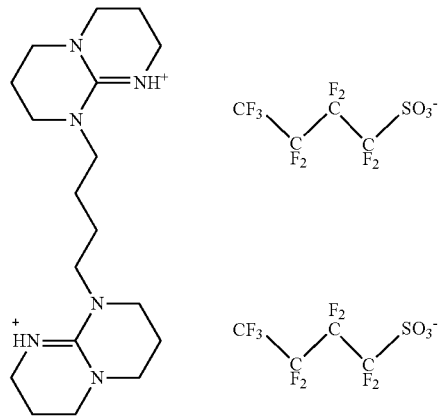

When contacting particles of a catalytic metal, the protonated dimeric ionic liquid of the present disclosure [ ] improves ORR activity, and MEA performance as discussed further below. A catalyst that includes particles of a catalytic metal in contact with a protonated dimeric ionic liquid will be referred to herein as a secondary ionomer catalyst.

In certain examples discussed herein, the solid catalyst will include a mixture of platinum and carbon particles. In some examples, the catalyst composition can also include a polymeric ionomer, such as NAFION® (DuPont), a perfluorosulfonic acid (PFSA) contacting the solid catalyst.

In some examples, catalyst compositions of the present disclosure will have 9'9'-(butane-1,4-diyl)bis(3,4,6,7,8,9-hexahydro-2H-pyrimido[1,2-a]pyrimidin-1-ium) 1,1,2,2,3,3,4,4,4-nonafluorobutane-1-sulfonate present at a weight ratio relative to the solid catalyst within a range of 0.02:1 to 1:1. In some examples, catalyst compositions of the present disclosure will have 9'9'-(butane-1,4-diyl)bis(3,4,6,7,8,9-hexahydro-2H-pyrimido[1,2-a]pyrimidin-1-ium) 1,1,2,2,3,3,4,4,4-nonafluorobutane-1-sulfonate present at a weight ratio relative to the solid catalyst within a range of 0.05:1 to 0.5:1. In some examples, catalyst compositions of the present disclosure will have 9'9'-(butane-1,4-diyl)bis(3,4,6,7,8,9-hexahydro-2H-pyrimido[1,2-a]pyrimidin-1-ium) 1,1,2,2,3,3,4,4,4-nonafluorobutane-1-sulfonate present at a weight ratio relative to the solid catalyst within a range of 0.1:1 to 0.2:1. In some examples, particles of catalytic metal will be fully coated by the 9'9'-(butane-1,4-diyl)bis(3,4,6,7,8,9-hexahydro-2H-pyrimido[1,2-a]pyrimidin-1-ium) 1,1,2,2,3,3,4,4,4-nonafluorobutane-1-sulfonate, and in other examples, particles of catalytic metal will be partially coated by the 9'9'-(butane-1,4-diyl)bis(3,4,6,7,8,9-hexahydro-2H-pyrimido[1,2-a]pyrimidin-1-ium) 1,1,2,2,3,3,4,4,4-nonafluorobutane-1-sulfonate. In some examples, particles of catalytic metal will be porous and will be impregnated with the 9'9'-(butane-1,4-diyl)bis(3,4,6,7,8,9-hexahydro-2H-pyrimido[1,2-a]pyrimidin-1-ium) 1,1,2,2,3,3,4,4,4-nonafluorobutane-1-sulfonate.

MEAs of the present disclosure include electrodes having composites comprising a protonated dimeric ionic liquid and a fuel cell catalyst. The composite of the present disclosure provides enhanced performance of the MEA. More specifically, the composite of the present disclosure comprises a metal catalyst; and a protonated dimeric ionic liquid contacting the metal catalyst, the protonated dimeric ionic liquid comprising 9'9'-(butane-1,4-diyl)bis(3,4,6,7,8,9-hexahydro-2H-pyrimido[1,2-a]pyrimidin-1-ium) 1,1,2,2,3,3,4,4,4-nonafluorobutane-1-sulfonate.

The metal catalyst of the composite of the present disclosure can comprise a platinum alloy. The metal catalyst can comprise a platinum-cobalt alloy. In some examples, a polymeric ionomer is in physical contact with the metal catalyst. The presence of a polymeric ionomer acts as a protonic bridge between the membrane and catalyst surface as well as a binder for a carbon supported catalyst. PFSA polymers are commercially available. Non-limiting examples of PFSA polymers are the lines of products sold under the tradenames NAFION® (marketed by the Chemours Company) and Aquivion® (marketed by Solvay®).

One example of a perfluorosulfonic acid (PFSA) polymer employed in examples of the present disclosure is NAFION® developed by DuPont. Other commercially available examples include FLEMION® (Asahi Glass Company) ACIPLEX® (Asahi Kasci), Aquivion® (Solvay) and FUMION® (FuMA-Tech).

The present disclosure also includes membrane electrode assemblies (MEAs) for polymer electrolyte membrane fuel cells (PEMFCs). MEAs of the present teachings include electrodes having composites of catalyst and protonated dimeric ionic liquid. The disclosed MEAs exhibit notably superior performance at low relative humidity, compared to MEAs lacking the protic ionic liquid, across a broad range of current densities. The disclosed MEAs also exhibit notably superior performance at high relative humidity, compared to MEAs lacking the protonated dimeric ionic liquid, at high current densities.

MEAs of the present teachings include a composite cathode having a cathode catalyst mixed with an ionic liquid of formula 9'9'-(butane-1,4-diyl)bis(3,4,6,7,8,9-hexahydro-2H-pyrimido[1,2-a]pyrimidin-1-ium) 1,1,2,2,3,3,4,4,4-nonafluorobutane-1-sulfonate. The catalyst can include platinum or a platinum alloy, such as a platinum-cobalt alloy. The composite cathode improves MEA performance in both low and high humidity.

FIG. 1 shows a schematic cross sectional view of an exemplary, disclosed MEA 100 for a PEMFC. The MEA 100 includes a polymer electrolyte membrane (PEM) 110 configured to support proton transfer (i.e., proton conduction) across the membrane, and to be electrically insulative. The PEM 110 can be a pure polymer membrane or a composite membrane, and can be formed of any suitable material, such as perfluorosulfonic acid polymers, other fluoropolymers, or any other suitable material. The MEA 100 further includes an anodic catalyst layer 120, configured to electrolytically catalyze an anodic hydrogen-splitting reaction: $H_2 \rightarrow 2e^- + 2H^+$.

The anodic catalyst layer can be substantially formed of anodic catalyst particles of platinum, or a platinum alloy supported on carbon, such as carbon black.

The MEA 100 further includes a cathodic catalyst layer 130, configured to catalyze an oxygen reduction reaction: $O_2 + 4e^- + 4H^+ \rightarrow 2H_2O$.

The cathodic catalyst layer 130 can include cathodic catalyst particles of platinum or a platinum alloy supported on carbon, such as carbon black. The cathodic catalyst will typically further include an ionic liquid in admixture with the carbon-supported cathodic catalyst particles. In many examples, the protonated dimeric ionic liquid will be 9'9'-(butane-1,4-diyl)bis(3,4,6,7,8,9-hexahydro-2H-pyrimido[1,2-a]pyrimidin-1-ium) 1,1,2,2,3,3,4,4,4-nonafluorobutane-1-sulfonate.

In some examples, the anodic catalyst layer 120 and/or the cathodic catalyst layer 130 can include a solid ionomer, such as a fluorinated polymer, e.g., NAFION®. In some examples, the anodic catalyst layer 120 can include platinum (whether present unalloyed or in an alloy) at a loading density of about 0.05 $mg_{Pt}/cm^2$; and the cathodic catalyst layer 130 can include platinum (whether present unalloyed or in an alloy) at a loading density within a range of from about 0.1 to about 0.15 $mg_{Pt}/cm^2$, inclusive. In some examples, the weight ratio of ionic liquid to carbon-supported cathodic catalyst particles can be about 1:10.

It will be understood that the PEM places the anodic catalyst layer 120 and the cathodic catalyst layer in protic communication with one another. The MEA 100 can include first and second gas diffusion layers 140A, 140B in contact with the anodic catalyst layer 120 and the cathodic catalyst layer 130, respectively. The first and second gas diffusion layers 140A, 140B are configured to allow hydrogen and oxygen gas to diffuse to the anodic and cathodic catalyst layers, 120, 130, respectively, and to allow water product to diffuse away from the cathodic catalyst layer 130. The MEA 100 can further include anodic and cathodic current collectors 150A, 150B, configured to be in electric communication with the anodic and cathodic catalyst layers 120, 130, respectively, and to connect to be connected to an external circuit 160.

A membrane electrode assembly (MEA) for a polymer electrolyte membrane fuel cell, the MEA comprising: at least one catalyst layer which comprises a protonated dimeric ionic liquid comprising 9'9'-(butane-1,4-diyl)bis(3,4,6,7,8,9-hexahydro-2H-pyrimido[1,2-a]pyrimidin-1-ium) 1,1,2,2,3,3,4,4,4-nonafluorobutane-1-sulfonate.

A membrane electrode assembly (MEA) for a polymer electrolyte membrane fuel cell, the MEA comprising: an anodic catalyst layer; a cathodic catalyst layer comprising carbon supported cathodic catalyst particles selected from the group consisting of platinum and a platinum alloy and a protonated dimeric ionic liquid comprising 9'9'-(butane-1,4-diyl)bis(3,4,6,7,8,9-hexahydro-2H-pyrimido[1,2-a]pyrimidin-1-ium) 1,1,2,2,3,3,4,4,4-nonafluorobutane-1-sulfonate; and a polymer electrolyte membrane mediating protic communication between the anodic catalyst layer and the cathodic catalyst layer.

A polymer electrolyte membrane fuel cell (PEMFC) comprising a plurality of stacked membrane electrode assemblies (MEAs), each MEA of the plurality comprising: an anodic catalyst layer; a cathodic catalyst layer comprising carbon supported cathodic catalyst particles selected from the group consisting of platinum and a platinum alloy and a protonated dimeric ionic liquid comprising 9'9'-(butane-1,4-diyl)bis(3,4,6,7,8,9-hexahydro-2H-pyrimido[1,2-a]pyrimidin-1-ium) 1,1,2,2,3,3,4,4,4-nonafluorobutane-1-sulfonate; and a polymer electrolyte membrane mediating protic communication between the anodic catalyst layer and the cathodic catalyst layer.

Figure 2:
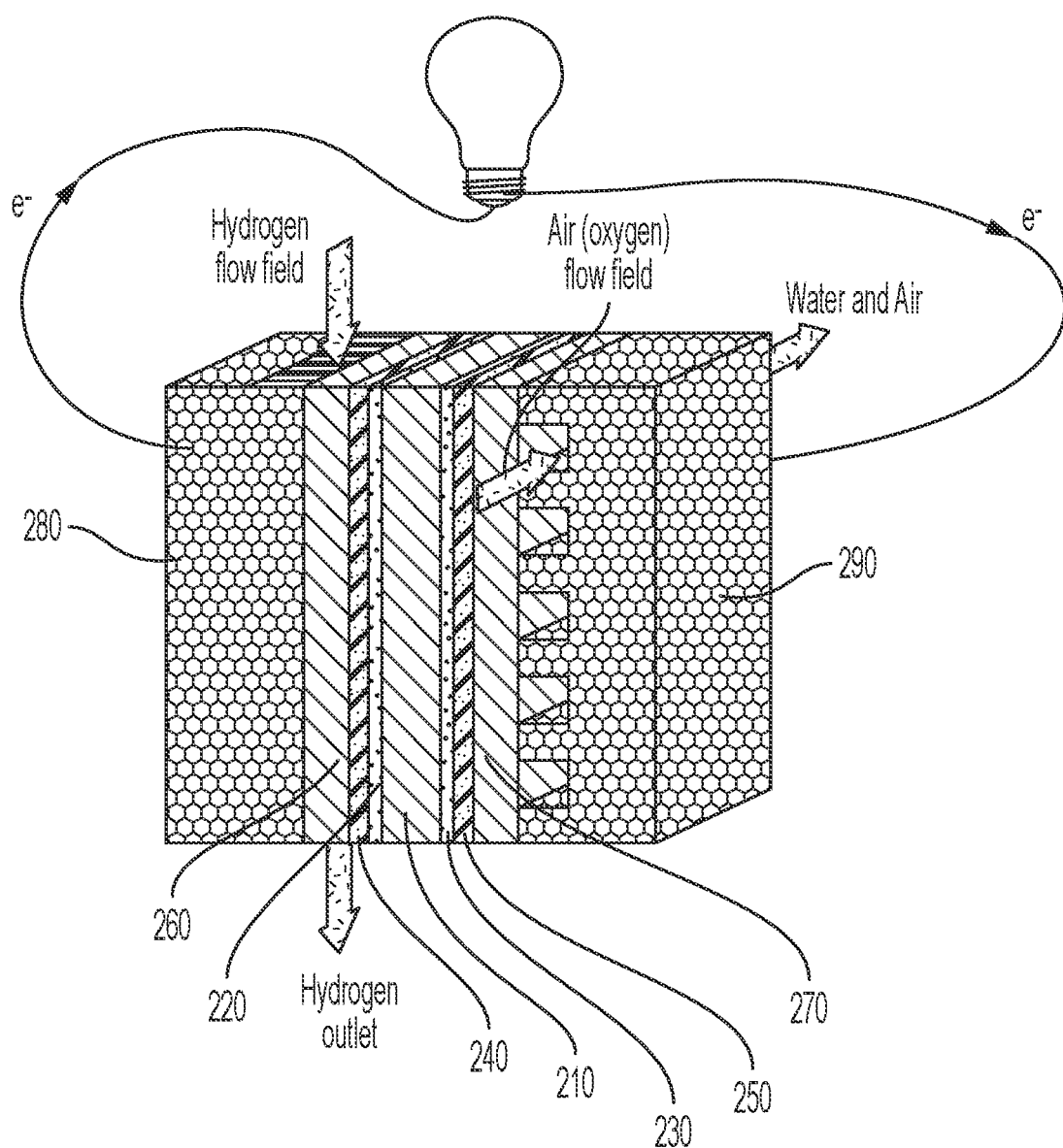
FIG. 2 is a schematic cross-sectional view of a portion of an exemplary fuel cell of the present disclosure.

FIG. 2 illustrates an example of a fuel cell 200 having a polymer electrolyte membrane 210, an anodic catalytic layer 220 and a cathodic catalytic layer 230. An anode microporous layer 240 contacts the anodic catalytic layer 220. An anode gas diffusion layer 260 contacts the anode microporous layer 240. A cathode microporous layer 250 contacts the cathodic catalytic layer 230. A cathode gas diffusion layer 270 contacts the cathode microporous layer 250. An anode bipolar plate 280 contacts the anode gas diffusion layer 260 and a cathode bipolar plate 290 contacts the cathode gas diffusion layer 270. Hydrogen and air flow within the cell is pictured in FIG. 2. Hydrogen ($H_2$) is fed to the anode side of the fuel cell and an oxygen source (such as ambient air) is fed to the cathode side of the fuel cell. In FIG. 2, water and excess air are depicted as exiting the cathode side of the fuel cell and unreacted hydrogen is shown as exiting the anode side of the fuel cell.

The anode bipolar plate 280 and the cathode bipolar plate 290 can independently be made from a metal (such as titanium or stainless steel), or a carbon structure (such as graphite). Some metal bipolar plates use a carbon film coating on some or all surfaces of the bipolar plate. U.S. Pat. No. 10,283,785, incorporated herein by reference, teaches use of an amorphous carbon film in bipolar plates. In the fuel cell, the fuel gas and the oxygen gas should be separately supplied to the entire electrode surfaces without being mixed with each other. Therefore, the bipolar plates should be gas tight. Furthermore, the bipolar plates should collect electrons generated by the reaction and have good electric conductivity in order to serve as electric connectors for connecting adjoining single cells when a plurality of single cells are stacked. Moreover, because electrolyte membrane surfaces are strongly acidic, the bipolar plates provide good corrosion resistance. The main purpose of bipolar plate to fulfill in PEMFC stack is to supply fuel (hydrogen) and oxygen to the cell and also to manage heat produced and water flow. It is also used as a backing medium for stacking of individual fuel cells.

Figure 3:
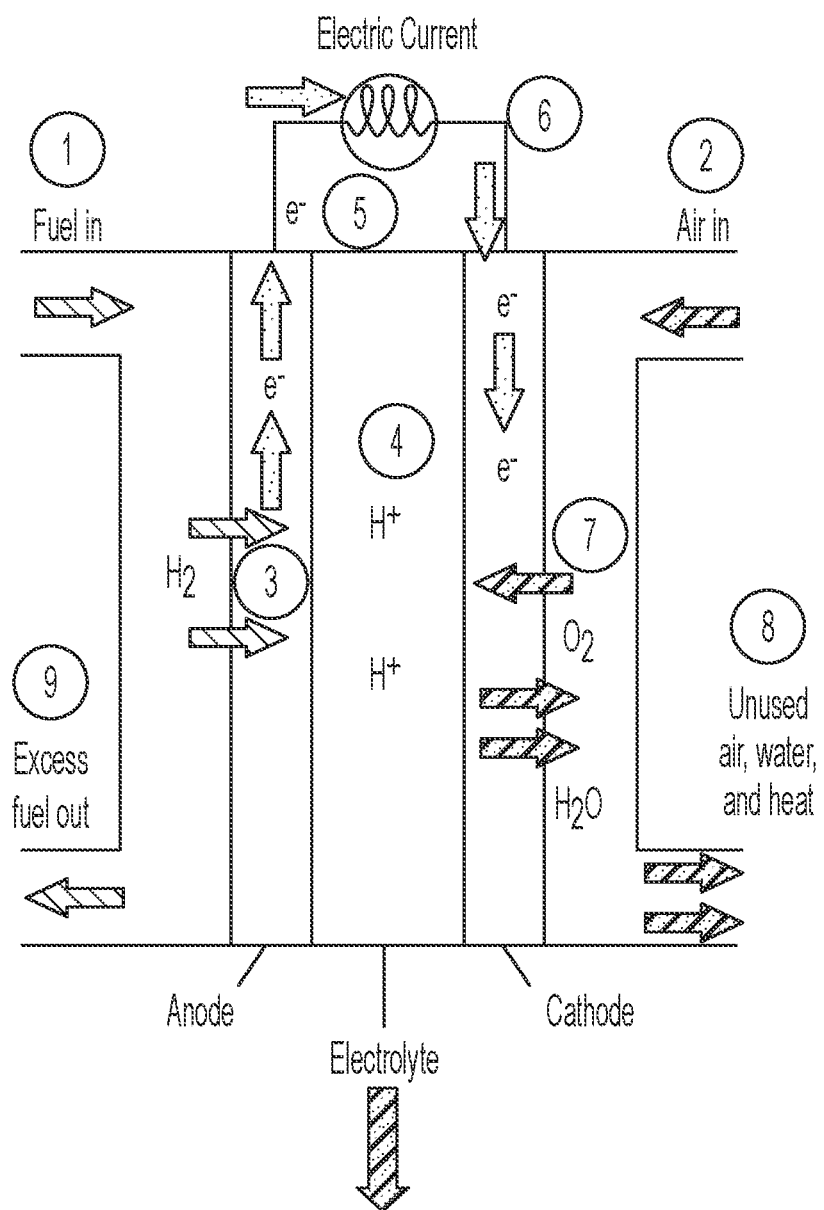
FIG. 3 is a schematic cross-sectional view of a portion of an exemplary fuel cell of the present disclosure.

FIG. 3 illustrates how a PEMFC works. At 1, pure hydrogen from the fuel tank or onboard reformer is fueled from the anode side while at 2 oxygen from air is injected from the cathode side with the help of bipolar plates on both sides (not shown). At 3, at the anode, the hydrogen molecule is split into hydrogen ions (protons) and electrons. At 4, the hydrogen ions permeate across the electrolyte to the cathode while at 5 the electrons are forced out of the anode and produce electric current at 6 that flows to the cathode through the external load and produce electric power. At 7, oxygen, usually in the form of air, is supplied to the cathode and combines with the electrons and the hydrogen ions to produce water. Unused air, water, and heat exit on the cathode side at 8 and excess fuel exits out the anode side at 9.

Figure 4A:
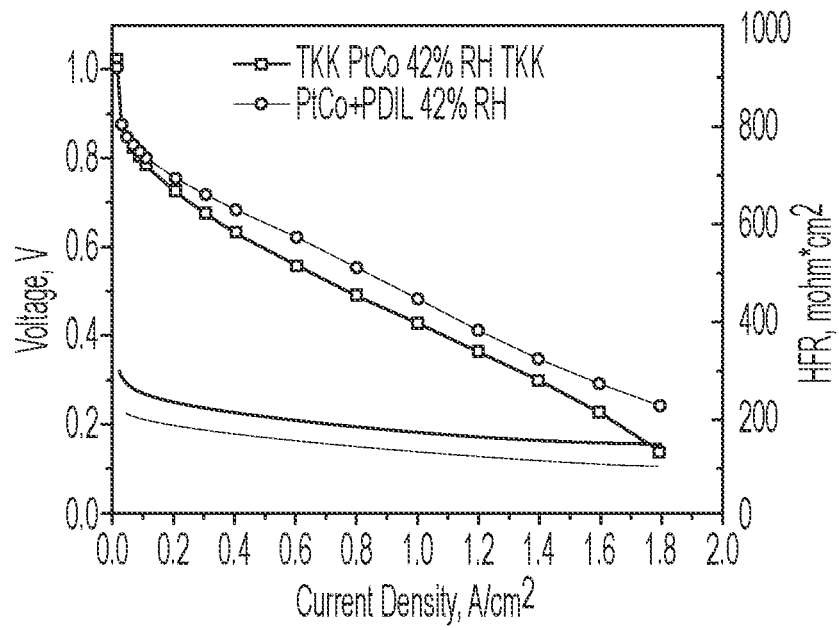
FIG. 4A is a plot of polarization curves and high frequency resistance (HFR) showing a comparison of performance of a MEA including TKK PtCo with the protonated dimeric ionic liquid of the present disclosure designated as (PDIL) and TKK PtCo without the protonated dimeric ionic liquid at 42% RH.
Figure 4B:
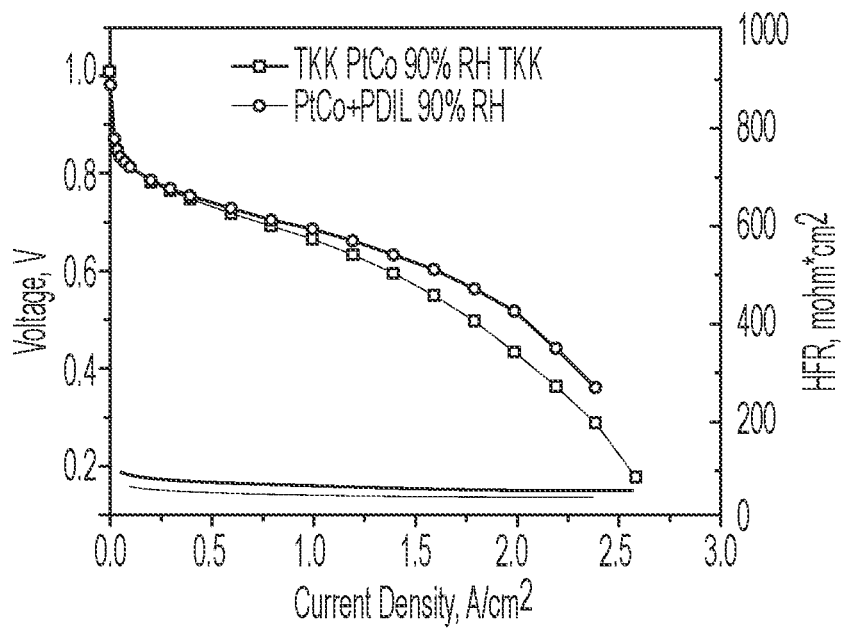
FIG. 4B is a plot of polarization curves and high frequency resistance (HFR) showing a comparison of performance of a MEA including TKK PtCo with the protonated dimeric ionic liquid of the present disclosure designated as (PDIL) and TKK PtCo without the protonated dimeric ionic liquid at 90% RH.

Performance of the membrane assembly electrode of the present disclosure were evaluated as described in the examples. As shown in FIGS. 4A and 4B show the comparison of performance of a MEA including with the protonated dimeric ionic liquid of the present disclosure (TKK PtCo+9'9'-(butane-1,4-diyl)bis(3,4,6,7,8,9-hexahydro-2H-pyrimido[1,2-a]pyrimidin-1-ium) 1,1,2,2,3,3,4,4,4-nonafluorobutane-1-sulfonate) and without the protonated dimeric ionic liquid (TKK PtCo) at 42% RH and at 90% RH, respectively. The MEA employing TKK PtCo+9'9'-(butane-1,4-diyl)bis(3,4,6,7,8,9-hexahydro-2H-pyrimido[1,2-a]pyrimidin-1-ium) 1,1,2,2,3,3,4,4,4-nonafluorobutane-1-sulfonate showed a significant improvement in MEA performance compared to TKK PtCo throughout the current range. Additionally, the high frequency resistance (HFR) of PtCo+9'9'-(butane-1,4-diyl)bis(3,4,6,7,8,9-hexahydro-2H-pyrimido[1,2-a]pyrimidin-1-ium) 1,1,2,2,3,3,4,4,4-nonafluorobutane-1-sulfonate was much smaller than TKK PtCo, suggesting that the protonated dimeric liquid of the present disclosure promotes proton diffusion within the catalyst layer. The activation loss of TKK PtCo+9'9'-(butane-1,4-diyl)bis(3,4,6,7,8,9-hexahydro-2H-pyrimido[1,2-a]pyrimidin-1-ium) 1,1,2,2,3,3,4,4,4-nonafluorobutane-1-sulfonate is less than TKK PtCo, particularly at low humidity (42% RH), which indicates that there is a sufficient proton supply when the protonated dimeric ionic liquid of the present disclosure is used.

Figure 5A:
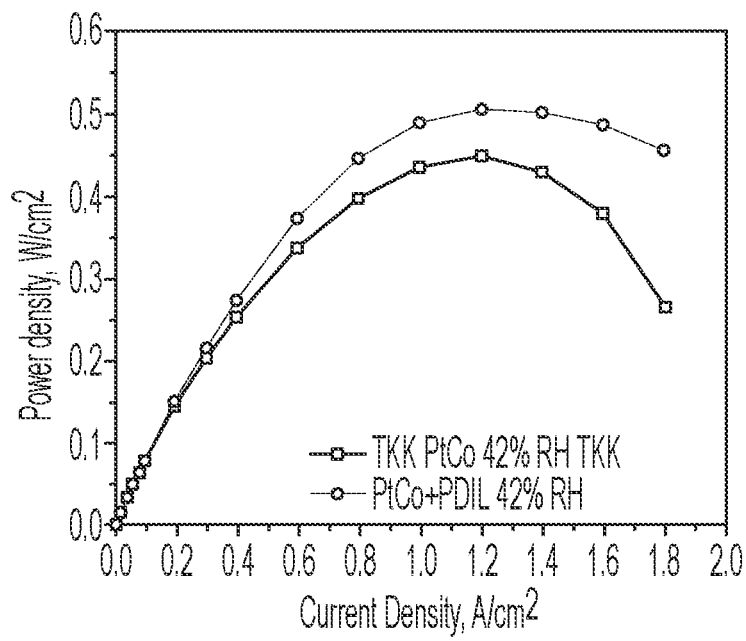
FIG. 5A is a plot of power density as a function of current density showing a comparison of the MEA power density of TKK PtCo with the protonated dimeric ionic liquid of the present disclosure designated as (PDIL) and PtCo (TKK) without the protonated dimeric ionic liquid at 42% RH.
Figure 5B:
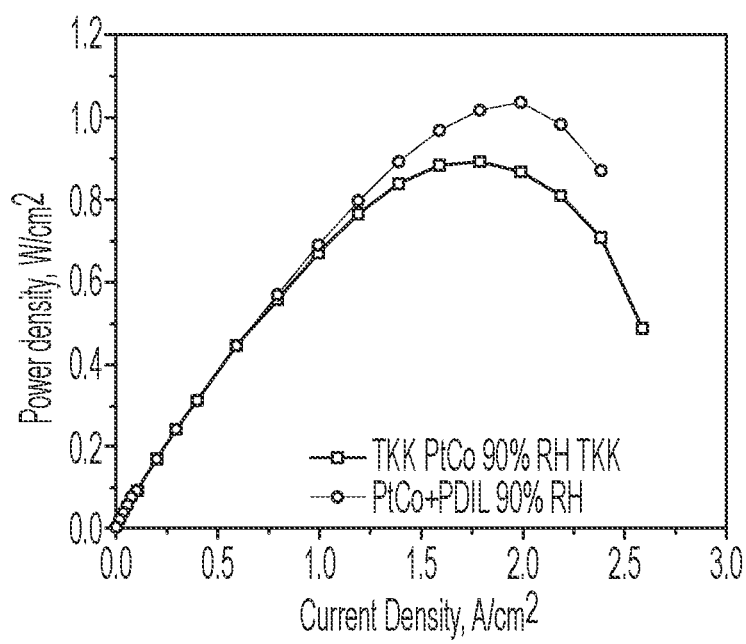
FIG. 5B is a plot of power density as a function of current density showing a comparison of the MEA power density with the protonated dimeric ionic liquid of the present disclosure (TKK PtCo+PDIL) and MEA power density without the protonated dimeric ionic liquid (TKK PtCo) at 90% RH.

FIGS. 5A and 5B show the comparison of performance of a MEA with the protonated dimeric ionic liquid of the present disclosure (TKK PtCo+9'9'-(butane-1,4-diyl)bis(3,4,6,7,8,9-hexahydro-2H-pyrimido[1,2-a]pyrimidin-1-ium) 1,1,2,2,3,3,4,4,4-nonafluorobutane-1-sulfonate) and without the protonated dimeric ionic liquid (TKK PtCo) at 42% RH and 90% RH, respectively. The maximum power density of a MEA with TKK PtCo+9'9'-(butane-1,4-diyl)bis(3,4,6,7,8,9-hexahydro-2H-pyrimido[1,2-a]pyrimidin-1-ium) 1,1,2,2,3,3,4,4,4-nonafluorobutane-1-sulfonate improved 13% at low humidity (42% RH) (FIG. 5A) and 16% at high humidity (90% RH) (FIG. 5B), respectively.

Figure 6:
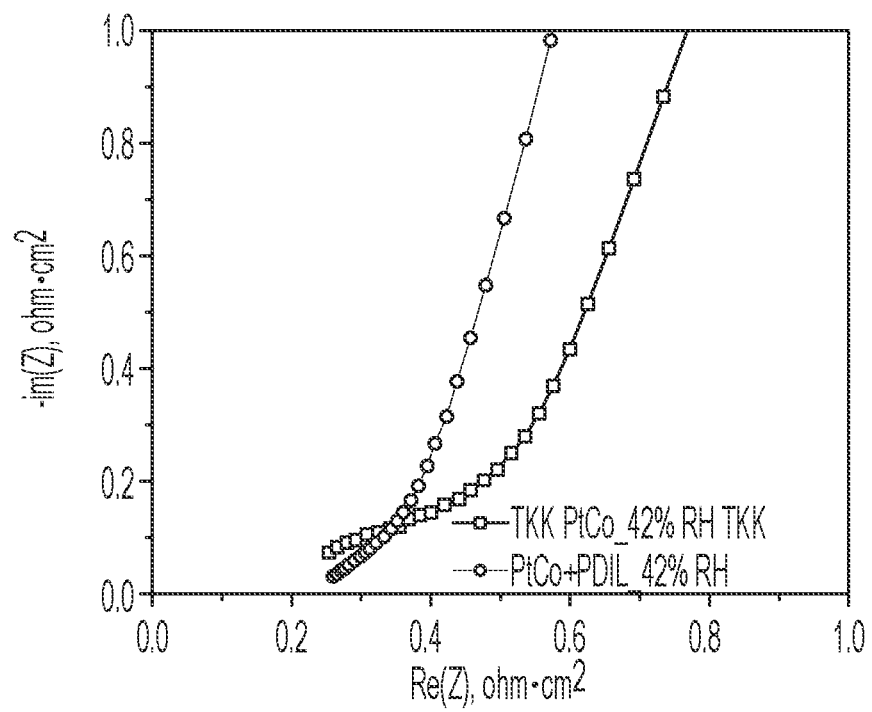
FIG. 6 is an impedance plot showing the comparison of the proton diffusion resistance (RH$^+$) of the MEA with the protonated dimeric ionic liquid of the present disclosure of (TKK PtCo+PDIL) and TKK PtCo without the protonated dimeric ionic liquid at 42% RH.
Figure 7:
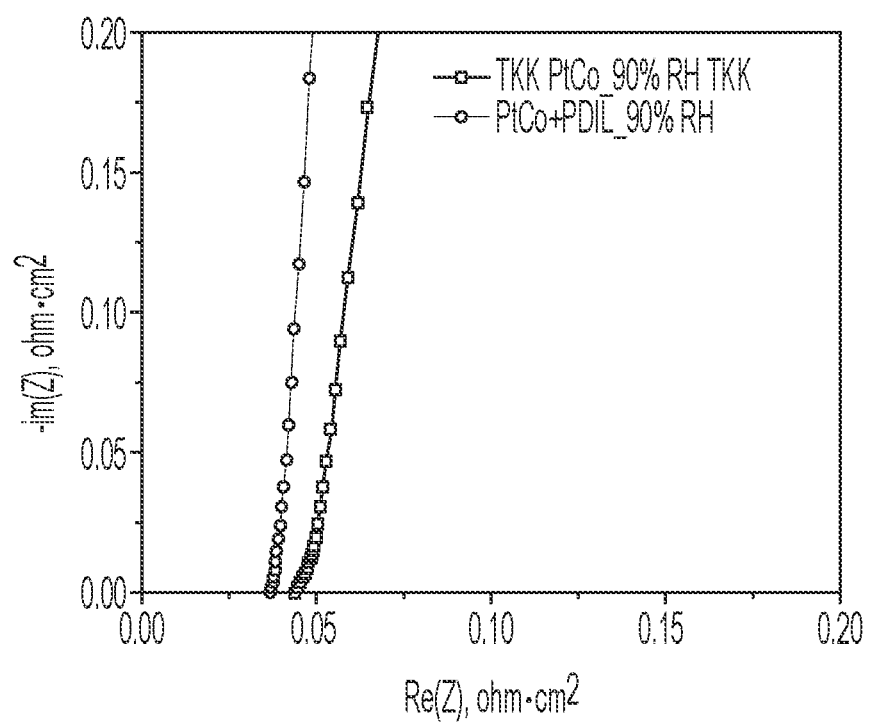
FIG. 7 is an impedance plot showing the comparison of the proton diffusion resistance (RH$^+$) of the MEA with the protonated dimeric ionic liquid of the present disclosure (TKK PtCo+PDIL) and TKK PtCo without the protonated dimeric ionic liquid at 90% RH.

Electrochemical impedance spectroscopy (EIS) was used to measure the effective proton conductivity within the MEA catalyst layer. FIGS. 6A and 6B show the comparison of the effective catalyst layer protonic resistance of a MEA with a catalyst layer having the protonated dimeric ionic liquid of the present disclosure (TKK PtCo+9'9'-(butane-1,4-diyl)bis(3,4,6,7,8,9-hexahydro-2H-pyrimido[1,2-a]pyrimidin-1-ium) 1,1,2,2,3,3,4,4,4-nonafluorobutane-1-sulfonate) and of a MEA with a catalyst layer without the protonated dimeric ionic liquid (TKK PtCo) at 42% RH and 90% RH, respectively. It can be seen in FIG. 6 and FIG. 7 that the proton resistance of a MEA with a catalyst layer having the protonated dimeric ionic liquid of the present disclosure (TKK PtCo+9'9'-(butane-1,4-diyl)bis(3,4,6,7,8,9-hexahydro-2H-pyrimido[1,2-a]pyrimidin-1-ium) 1,1,2,2,3,3,4,4,4-nonafluorobutane-1-sulfonate) is significantly less than of a MEA with a catalyst layer without the protonated dimeric ionic liquid (TKK PtCo) in the case of both low humidity (42% RH) and high humidity (90% RH). Thus, adding the protonated dimeric ionic liquid of the present disclosure significantly improves proton conductivity of the MEA catalyst layer.

The above results show that the addition of the protonated dimeric ionic liquid to the catalyst significantly improved performance of the MEA, and performance of the fuel cell.

EXAMPLES

Various aspects of the present disclosure are further illustrated with respect to the following examples. It is to be understood that these examples are provided to illustrate specific examples of the present disclosure and should not be construed as limiting the scope of the present disclosure in or to any particular aspect.

Example 1. Synthesis of Protonated Dimeric Ionic Liquid 1,5,7-Triazabicyclo[4.4.0]dec-5-ene is dissolved in anhydrous tetrahydrofuran, and sodium hydride (NaH) is added to make the sodium salt intermediate shown below.

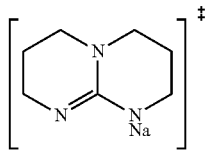

Then 1,4-dibromobutane is added to synthesize the following neutral dimer, which is recovered as a solid.

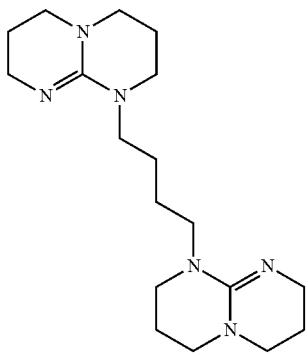 [SMILES: C(CCN1CCCN2CCCN=C12)CN1CCCN2CCCN=C12]

The neutral dimer is dissolved in methanol. Nitric acid is added to the methanol solution to produce a nitrate precursor. Potassium nonafluoro-1-butanesulfonate is then added to produce the dimeric ionic liquid, as shown below. The compound is extracted with dichloromethane.

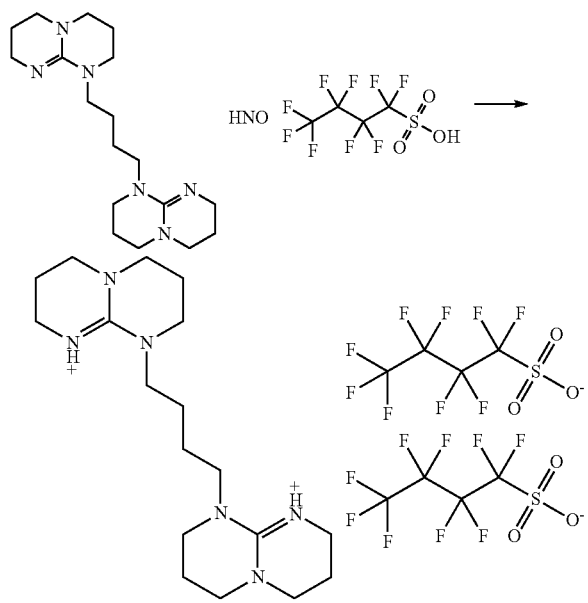

Example 2. Impregnation of Protonated Dimeric Ionic Liquid 9'9'-(butane-1,4-diyl)bis(3,4,6,7,8,9-hexahydro-2H-pyrimido[1,2-a]pyrimidin-1-ium) 1,1,2,2,3,3,4,4,4-nonafluorobutane-1-sulfonate into Catalyst 200 mg PtCo alloy on carbon catalyst with a platinum (Pt) content of 47.4 wt. % and a cobalt (Co) content of 4.9 wt. % (TEC36E52, TKK) was wet with 1 ml deionized water. 19.08 mg (IL/C=0.2) 9,9'-(butane-1,4-diyl)bis(3,4,6,7,8,9-hexahydro-2H-pryimido[1,2-a]pyrimidin-1-ium) 1,1,2,2,3,3,4,4,4-nonafluorobutane)-1-sulfonate was dissolved in 10 ml iso-propanol, which was then added into the wetted PtCo catalyst. The slurry was stirred for 2 hours at room temperature and then dried at 50° C. while being agitated. After the removal of solvent, the dried catalyst powder was then subjected to further drying at 50° C. for at least 24 hours in an oven. The finally obtained powder composite was ready for the ink preparation.

Example 3. MEA Fabrication

The PtCo/C-9'9'-(butane-1,4-diyl)bis(3,4,6,7,8,9-hexahydro-2H-pyrimido[1,2-a]pyrimidin-1-ium) 1,1,2,2,3,3,4,4,4-nonafluorobutane-1-sulfonate and pristine PtCo/C were used as the cathode material and evaluated in the MEA. The catalyst ink consisted of ethanol, water, ionomer (D2020), and catalysts. The ionomer to carbon (I/C) weight ratio and the solid content were kept at 0.7, and 14 wt. %, respectively. The ink slurry was vigorously mixed and coated on a poly (tetrafluoro-ethylene) substrate (0.002" thick, Macmaster-CARR) using a doctor-blade casting method. Similarly, a Pt/C (30 wt. % Pt content, TEC10EA30E, TKK) catalyst layer with I/C ratio at 1.07 was prepared as the anode material. The coating layer was dried at 80° C. to remove the solvent. The final anode and cathode Pt loading were controlled at 0.05 and 0.143-0.146 $mg_{Pt}/cm^2$.

Individual cathode and anode electrocatalyst layers (2 cm×2 cm) were punched and sandwiched between a NAFION® 211 membrane to form a catalyst coated membrane (CCM) using a decal-transfer technique. The hot-pressing condition was 130° C., 0.8 Mpa, and 5 mins. The gas diffusion layers (29 BC, SGL Carbon) together with CCM were assembled in a single cell with a serpentine flow field (Scribner Associates).

Example 4. MEA Evaluation

An 850e Fuel Cell test system (Scribner Associates) was used for the MEA performance evaluation. The MEA was first activated by sweeping between 0.9 V to 0.1 V for several hundred timed cycles under $H_2$/Air (0.5 NLPM/1 NMPM) at 45° C. and 100% relative humidity (RH). Then performance of the MEAs was tested at 80° C. under 42% RH and 90% RH, respectively. Ultrapure $H_2$ and Air (Air-gas) were supplied to the anode and cathode with an absolute pressure of 150 Kpa. The current density was set with increments of 0.05 A/cm² to 3 A/cm² and the response voltage was recorded simultaneously. The high frequency resistance (HFR) was also examined throughout the measurement.

Example 5. Electrochemical Measurement

Electrochemical Impedance Spectroscopy (EIS) was measured at 0.45 V under $H_2/N_2$ (0.5 NLPM/1 NMPM) with fuel cell temperature at 80° C.

The present disclosure can be applicable to various other aspects, such as a vehicle driven by utilizing electric power of the fuel cell, a power generation system that supplies electric power of the fuel cell, and other articles comprising the fuel cells. In some examples, the vehicle can be a passenger car or truck. In some examples the power generation system can be stationary. The present disclosure is not limited to the above aspects or examples but can be implemented by any of various other aspects or examples within the scope of the disclosure.

Further, the disclosure comprises additional notes and examples as detailed below.

Clause 1. An oxygen reduction reaction (ORR) catalyst comprising:
a metal catalyst; and
a protonated dimeric ionic liquid contacting the metal catalyst, the protonated dimeric ionic liquid comprising 9'9'-(butane-1,4-diyl)bis(3,4,6,7,8,9-hexahydro-2H-pyrimido[1,2-a]pyrimidin-1-ium) 1,1,2,2,3,3,4,4,4-nonafluorobutane-1-sulfonate.

Clause 2. The ORR catalyst of clause 1, wherein the metal catalyst is a solid metal catalyst.

Clause 3. The ORR catalyst of clause 1 or 2, wherein the metal catalyst comprises nanoparticles of platinum or a platinum alloy.

Clause 4. The ORR catalyst of any one of clauses 1-3, wherein the metal catalyst comprises a platinum-cobalt alloy.

Clause 5. The ORR catalyst of any one of clauses 1-4, further comprising a polymeric ionomer in physical contact with the metal catalyst.

Clause 6. The ORR catalyst of any one of clauses 1-5, wherein the polymeric ionomer is a perfluorosulfonic acid polymer.

Clause 7. The ORR catalyst of any one of clauses 1-6, wherein the protonated dimeric ionic liquid partially coats the metal catalyst.

Clause 8. The ORR of any one of clauses 1-7, wherein the protonated dimeric ionic liquid completely coats the metal catalyst.

Clause 9. A membrane electrode assembly (MEA), the MEA comprising:
at least one catalyst layer which comprises a metal catalyst; and
a protonated dimeric ionic liquid comprising 9'9'-(butane-1,4-diyl)bis(3,4,6,7,8,9-hexahydro-2H-pyrimido[1,2-a]pyrimidin-1-ium) 1,1,2,2,3,3,4,4,4-nonafluorobutane-1-sulfonate.

Clause 10. The MEA of clause 9, wherein the metal catalyst is a solid metal catalyst.

Clause 11. The MEA of clause 9 or 10, wherein the metal catalyst comprises nanoparticles of platinum or a platinum alloy.

Clause 12. The MEA of any one of clauses 9-11, wherein the metal catalyst comprises a platinum-cobalt alloy.

Clause 13. The MEA of any one of clauses 9-12, further comprising a polymeric ionomer in physical contact with the metal catalyst.

Clause 14. The MEA of any one of clauses 9-13, wherein the polymeric ionomer is a perfluorosulfonic acid polymer.

Clause 15. A membrane electrode assembly (MEA), the MEA comprising:
an anodic catalyst layer;
a cathodic catalyst layer comprising carbon supported cathodic catalyst particles selected from platinum and a platinum alloy, and a protonated dimeric ionic liquid comprising 9'9'-(butane-1,4-diyl)bis(3,4,6,7,8,9-hexahydro-2H-pyrimido[1,2-a]pyrimidin-1-ium) 1,1,2,2,3,3,4,4,4-nonafluorobutane-1-sulfonate; and
a polymer electrolyte membrane mediating protic communication between the anodic catalyst layer and the cathodic catalyst layer.

Clause 16. The MEA of clause 15, wherein the cathodic catalyst particles comprise a platinum alloy.

Clause 17. The MEA of clause 15 or 16, wherein the cathodic catalyst particles comprise a platinum-cobalt alloy.

Clause 18. The MEA of any one of clauses 15-17, wherein the polymer electrolyte membrane comprises a perfluorosulfonic acid polymer.

Clause 19. The MEA of any one of clauses 15-18, wherein the cathodic catalyst layer comprises a solid ionomer.

Clause 20. The MEA of any one of clauses 15-19, further comprising:
a first gas diffusion layer contacting the anodic catalyst layer;
a second gas diffusion layer contacting the cathodic catalyst layer;
an anodic current collector and a cathodic current collector configured to be in electric communication with the anodic and cathodic catalyst layers, respectively, and to be connected to an external circuit.

Clause 21. The MEA of any one of clauses 9-20, wherein the protonated dimeric ionic liquid partially coats the metal catalyst.

Clause 22. The MEA of any one of clauses 9-20, wherein the protonated dimeric ionic liquid completely coats the metal catalyst.

Clause 23. A polymer electrolyte membrane fuel cell (PEMFC) comprising a plurality of stacked membrane electrode assemblies (MEAs), wherein each MEA of the plurality comprises a MEA according to any one of clauses 15-22.

Clause 24. A polymer electrolyte membrane fuel cell (PEMFC) comprising a plurality of stacked membrane electrode assemblies (MEAs), each MEA of the plurality comprising:
an anodic catalyst layer;
a cathodic catalyst layer comprising carbon supported cathodic catalyst particles selected from platinum and a platinum alloy; and a protonated dimeric ionic liquid comprising 9'9'-(butane-1,4-diyl)bis(3,4,6,7,8,9-hexahydro-2H-pyrimido[1,2-a]pyrimidin-1-ium) 1,1,2,2,3,3,4,4,4-nonafluorobutane-1-sulfonate; and
a polymer electrolyte membrane mediating protic communication between the anodic catalyst layer and the cathodic catalyst layer.

Clause 25. The PEMFC of clause 24, wherein the cathodic catalyst particles comprise a platinum-cobalt alloy.

Clause 26. The PEMFC of clause 24 or 25, wherein the polymer electrolyte membrane comprises a perfluorosulfonic acid polymer.

Clause 27. The PEMFC of any one of clauses 24-26, wherein the protonated dimeric ionic liquid partially coats the metal catalyst.

Clause 28. The PEMFC of any one of clauses 24-27, wherein the protonated dimeric ionic liquid completely coats the metal catalyst.

Clause 29. A composite cathode having a cathode catalyst mixed with a protonated dimeric ionic liquid of formula 9'9'-(butane-1,4-diyl)bis(3,4,6,7,8,9-hexahydro-2H-pyrimido[1,2-a]pyrimidin-1-ium) 1,1,2,2,3,3,4,4,4-nonafluorobutane-1-sulfonate.

Clause 30. The composite cathode catalyst of clause 29, comprising platinum or a platinum alloy.

Clause 31. The composite cathode of clause 29 or 30, comprising a platinum-cobalt alloy.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure and are not intended to limit the disclosure of the technology or any aspect thereof. The recitation of multiple examples having stated features is not intended to exclude other embodiments having additional features, or other examples incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an example can or may comprise certain elements or features does not exclude other examples of the present technology that do not contain those elements or features.

As used herein, the term "about", in the context of concentrations of components of the formulations, typically means +/−1-5% of the stated value, more typically +/−4% of the stated value, more typically +/−3% of the stated value, more typically, +/−2% of the stated value, even more typically +/−1% of the stated value, and even more typically +1-0.5% of the stated value.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. An oxygen reduction reaction (ORR) catalyst comprising:
    a metal catalyst; and
    a protonated dimeric ionic liquid contacting the metal catalyst, the protonated dimeric ionic liquid comprising 9'9'-(butane-1,4-diyl)bis(3,4,6,7,8,9-hexahydro-2H-pyrimido[1,2-a]pyrimidin-1-ium) 1,1,2,2,3,3,4,4,4-nonafluorobutane-1-sulfonate.

2. The ORR catalyst as recited in claim 1, wherein the metal catalyst is a solid metal catalyst.

3. The ORR catalyst as recited in claim 1, wherein the metal catalyst comprises nanoparticles of platinum or a platinum alloy.

4. The ORR catalyst as recited in claim 1, wherein the metal catalyst comprises a platinum-cobalt alloy.

5. The ORR catalyst as recited in claim 1, further comprising a polymeric ionomer in physical contact with the metal catalyst.

6. The ORR as recited in claim 5, wherein the polymeric ionomer is a perfluorosulfonic acid polymer.

7. A membrane electrode assembly (MEA), the MEA comprising:
    at least one catalyst layer which comprises a metal catalyst; and
    a protonated dimeric ionic liquid comprising 9'9'-(butane-1,4-diyl)bis(3,4,6,7,8,9-hexahydro-2H-pyrimido[1,2-a]pyrimidin-1-ium) 1,1,2,2,3,3,4,4,4-nonafluorobutane-1-sulfonate.

8. The MEA as recited in claim 7, wherein the metal catalyst is a solid metal catalyst.

9. The MEA as recited in claim 7, wherein the metal catalyst comprises nanoparticles of platinum or a platinum alloy.

10. The MEA as recited in claim 7, wherein the metal catalyst comprises a platinum-cobalt alloy.

11. The MEA as recited in claim 7, further comprising a polymeric ionomer in physical contact with the metal catalyst.

12. The MEA as recited in claim 11, wherein the polymeric ionomer is a perfluorosulfonic acid polymer.

13. A membrane electrode assembly (MEA), the MEA comprising:
    an anodic catalyst layer;
    a cathodic catalyst layer comprising carbon supported cathodic catalyst particles selected from platinum and a platinum alloy, and a protonated dimeric ionic liquid comprising 9'9'-(butane-1,4-diyl)bis(3,4,6,7,8,9-hexahydro-2H-pyrimido[1,2-a]pyrimidin-1-ium) 1,1,2,2,3,3,4,4,4-nonafluorobutane-1-sulfonate; and
    a polymer electrolyte membrane mediating protic communication between the anodic catalyst layer and the cathodic catalyst layer.

14. The MEA as recited in claim 13, wherein the cathodic catalyst particles comprise a platinum alloy.

15. The MEA as recited in claim 13, wherein the cathodic catalyst particles comprise a platinum-cobalt alloy.

16. The MEA as recited in claim 13, wherein the polymer electrolyte membrane comprises a perfluorosulfonic acid polymer.

17. The MEA as recited in claim 16, wherein the cathodic catalyst layer comprises a solid ionomer.

18. A polymer electrolyte membrane fuel cell (PEMFC) comprising a plurality of stacked membrane electrode assemblies (MEAs), wherein each MEA of the plurality comprises a MEA according to claim 13.

19. The PEMFC as recited in claim 18, wherein the cathodic catalyst particles comprise a platinum-cobalt alloy.

20. The PEMFC as recited in claim 18, wherein the polymer electrolyte membrane comprises a perfluorosulfonic acid polymer.

* * * * *